US012570032B2

(12) United States Patent
Fuchii et al.

(10) Patent No.: US 12,570,032 B2
(45) Date of Patent: *Mar. 10, 2026

(54) PLASTICIZING DEVICE, INJECTION MOLDING DEVICE, AND THREE-DIMENSIONAL SHAPING DEVICE

(71) Applicant: SEIKO EPSON CORPORATION, Tokyo (JP)

(72) Inventors: Masashi Fuchii, Minowa-machi (JP); Hidenobu Maruyama, Azumino (JP); Kenta Anegawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 325 days.

This patent is subject to a terminal disclaimer.

(21) Appl. No.: 18/295,374

(22) Filed: Apr. 4, 2023

(65) Prior Publication Data

US 2023/0321883 A1      Oct. 12, 2023

(30) Foreign Application Priority Data

Apr. 6, 2022    (JP) ................................ 2022-063275

(51) Int. Cl.
 *B29C 45/76* (2006.01)
 *B29C 45/46* (2006.01)
 (Continued)

(52) U.S. Cl.
 CPC ............ *B29C 45/76* (2013.01); *B29C 45/464* (2013.01); *B29C 45/47* (2013.01); *B29C 45/54* (2013.01); *B29C 45/74* (2013.01); *B29C 45/77* (2013.01); *B29C 45/78* (2013.01); *B29C 64/106* (2017.08); *B29C 64/209* (2017.08);
 (Continued)

(58) Field of Classification Search
None
See application file for complete search history.

(56) References Cited

U.S. PATENT DOCUMENTS 6,638,053 B2    10/2003  Gellert et al.
12,358,196 B2 *   7/2025  Fuchii ..................... B29C 45/74
 (Continued)

FOREIGN PATENT DOCUMENTS

EP        0501773      2/1992
JP        H0577306      3/1993
 (Continued)

*Primary Examiner* — John J DeRusso
(74) *Attorney, Agent, or Firm* — WORKMAN NYDEGGER

(57) ABSTRACT

A plasticizing device includes a flat screw including a groove forming surface in which a groove is formed, a barrel having a facing surface and a communication hole formed in the facing surface, the communication hole allowing a plasticized material to flow out, a heating unit, a flow path through which the plasticized material flows, a nozzle communicating with the flow path, a plurality of measurement units configured to measure pressures or temperatures in the flow path, an aspiration delivery unit, including a cylinder, having a branch flow path and a plunger configured to move in the cylinder so as to aspirate the plasticized material into the branch flow path or deliver the aspirated plasticized material to the nozzle, and a control unit configured to identify a state of the plasticized material in the flow path based on measurement values of the measurement units.

9 Claims, 12 Drawing Sheets

(51) Int. Cl.

| | |
|---|---|
| *B29C 45/47* | (2006.01) |
| *B29C 45/54* | (2006.01) |
| *B29C 45/74* | (2006.01) |
| *B29C 45/77* | (2006.01) |
| *B29C 45/78* | (2006.01) |
| *B29C 64/106* | (2017.01) |
| *B29C 64/209* | (2017.01) |
| *B29C 64/393* | (2017.01) |
| *B33Y 30/00* | (2015.01) |
| *B33Y 50/02* | (2015.01) |

(52) U.S. Cl.
CPC ............ *B29C 64/393* (2017.08); *B33Y 30/00* (2014.12); *B33Y 50/02* (2014.12); *B29C 2945/76006* (2013.01); *B29C 2945/7604* (2013.01); *B29C 2945/7618* (2013.01); *B29C 2945/76461* (2013.01); *B29C 2945/76531* (2013.01); *B29C 2945/76605* (2013.01); *B29C 2945/76665* (2013.01)

(56) References Cited

U.S. PATENT DOCUMENTS

| | | | |
|---|---|---|---|
| 2005/0142245 A1 | 6/2005 | Chen et al. | |
| 2020/0406531 A1 | 12/2020 | Hashimoto et al. | |
| 2021/0197434 A1* | 7/2021 | Anegawa | B29C 45/62 |
| 2021/0221041 A1 | 7/2021 | Sasagawa | |
| 2022/0024097 A1 | 1/2022 | Maruyama et al. | |

FOREIGN PATENT DOCUMENTS

| | | |
|---|---|---|
| JP | 2000176983 | 6/2000 |
| JP | 2021-006375 A | 1/2021 |
| JP | 2021115705 | 8/2021 |

* cited by examiner

TEMPERATURE (°C)

SPECIFIED TEMPERATURE 200°C

SPECIFIED TEMPERATURE 150°C

DISTANCE (mm)

PLASTICIZING DEVICE, INJECTION MOLDING DEVICE, AND THREE-DIMENSIONAL SHAPING DEVICE

The present application is based on, and claims priority from JP Application Serial Number 2022-063275, filed Apr. 6, 2022, the disclosure of which is hereby incorporated by reference herein in its entirety.

BACKGROUND

1. Technical Field

The present disclosure relates to a plasticizing device, an injection molding device, and a three-dimensional shaping device.

2. Related Art

JP-A-2021-6375 discloses a three-dimensional shaping device that plasticizes a shaping material by a plasticizing device including a screw and a barrel. The three-dimensional shaping device measures a pressure in a flow path through which the plasticized shaping material flows, and controls a rotation speed of the screw according to the pressure.

In the device described in JP-A-2021-6375, since the pressure at one point in the flow path is measured, a state of the material in the flow path cannot be identified in detail. Therefore, there is a demand for a technique capable of identifying the state in the flow path through which the material flows in detail.

SUMMARY

According to a first aspect of the present disclosure, a plasticizing device is provided. The plasticizing device includes: a drive motor; a flat screw having a groove forming surface in which a groove is formed and configured to rotate around a drive shaft of the drive motor; a barrel having a facing surface facing the groove forming surface in a direction along the drive shaft and having a communication hole formed in the facing surface, the communication hole allowing a plasticized material as a plasticized material to flow out; a heating unit configured to heat the material supplied to the groove; a flow path through which the material or the plasticized material flows; a nozzle communicating with the flow path and allowing the plasticized material to flow to an outside; a plurality of measurement units configured to measure pressures or temperatures at a plurality of locations in the flow path; an aspiration delivery unit including a cylinder having a branch flow path as a part of the flow path and a plunger configured to move in the cylinder so as to aspirate the plasticized material into the branch flow path or deliver the aspirated plasticized material to the nozzle; and a control unit configured to identify a state of the material or the plasticized material in the flow path based on a plurality of measurement values measured by the plurality of measurement units, in which the plurality of measurement units measure temperatures or pressures at least at a plurality of locations in the branch flow path.

According to a second aspect of the present disclosure, an injection molding device is provided. The injection molding device includes: the plasticizing device; and a mold clamping device in which a mold into which the plasticized material flowing out of the nozzle is injected is disposed.

According to a third aspect of the present disclosure, a three-dimensional shaping device is provided. The three-dimensional shaping device includes: the plasticizing device and a stage having a shaping surface on which the plasticized material flowing out of the nozzle is deposited.

BRIEF DESCRIPTION OF THE DRAWINGS

FIG. 1 is a top view showing a schematic configuration of an injection molding device.

FIG. 3 is a cross-sectional view showing a schematic configuration of an injection unit.

FIG. 6 is a diagram showing an example of a measurement result of a temperature of a plasticized material in a branch flow path.

FIG. 12 is a diagram showing an example in which a plurality of measurement units are disposed in a barrel.

FIG. 13 is a diagram showing an example in which a plurality of measurement units are disposed in a nozzle.

DESCRIPTION OF EXEMPLARY EMBODIMENTS

A. First Embodiment

Figure 1:
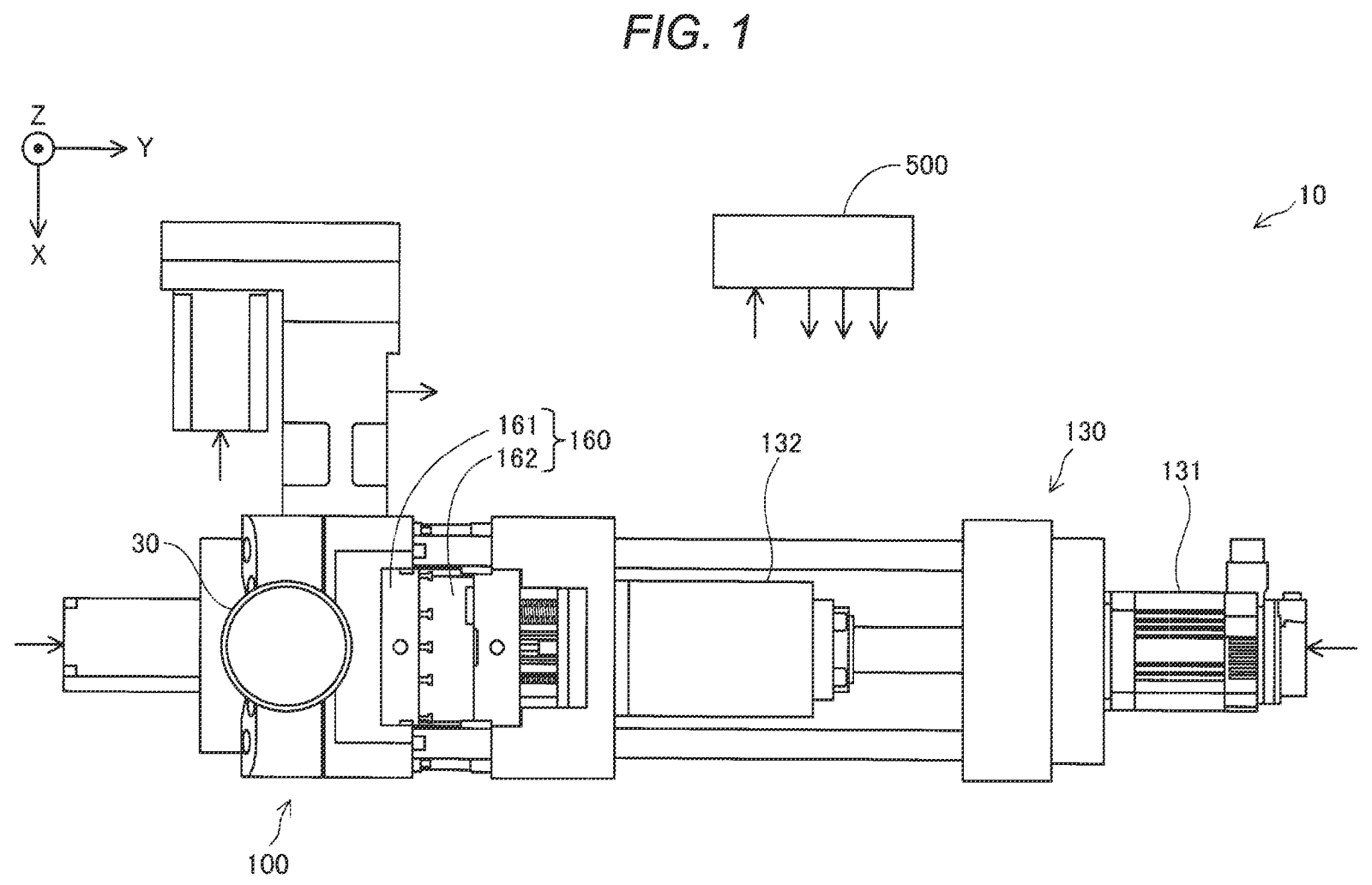
Figure 2:
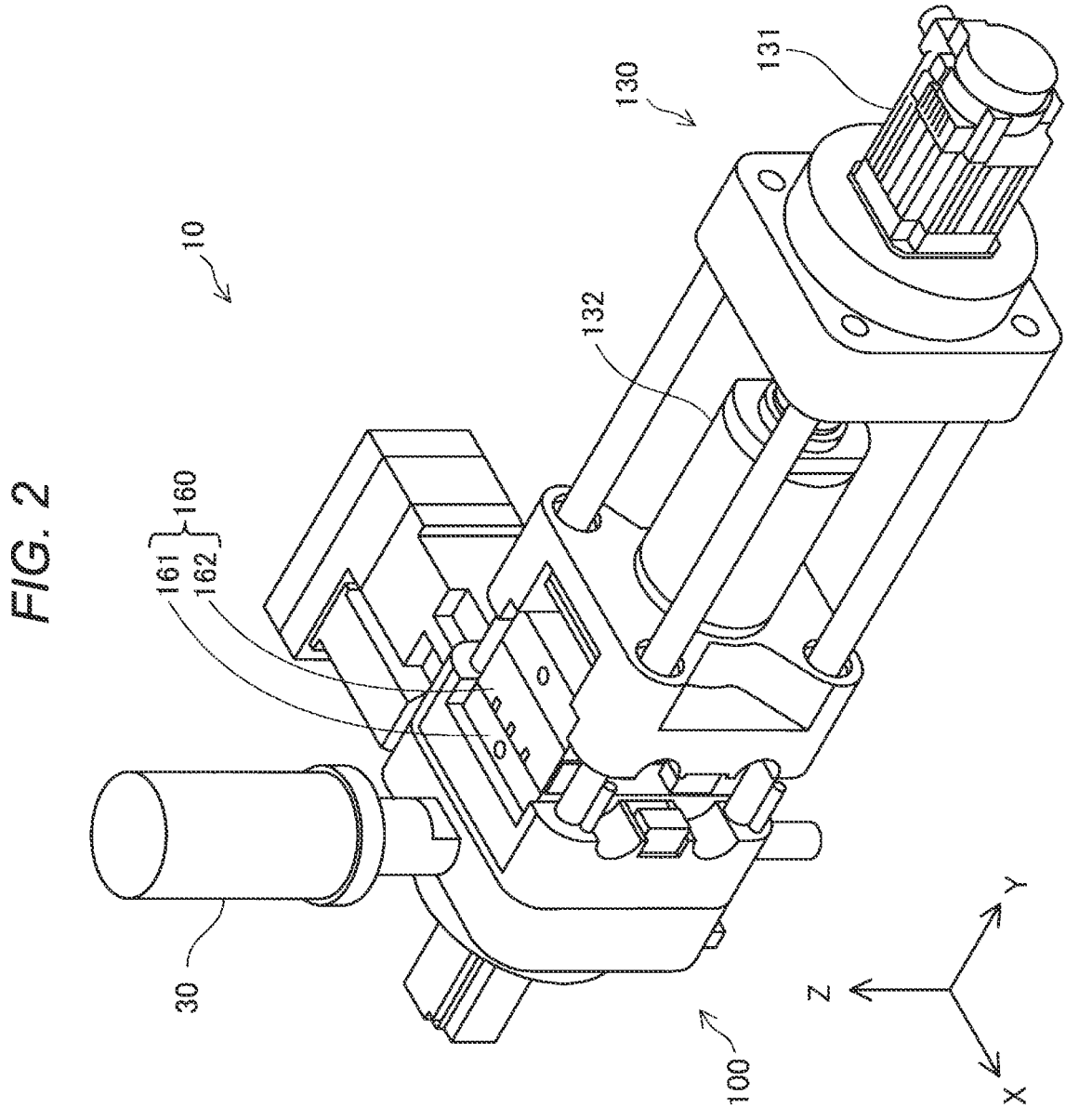
FIG. 2 is a perspective view showing the schematic configuration of the injection molding device.

FIG. 1 is a top view showing a schematic configuration of an injection molding device 10 according to a first embodiment. FIG. 2 is a perspective view showing the schematic configuration of the injection molding device 10. In FIGS. 1 and 2, arrows indicating X, Y, and Z directions orthogonal to one another are shown. The X direction and the Y direction are directions parallel to a horizontal plane, and the Z direction is a direction opposite to a gravity direction. The X, Y, and Z directions shown in FIG. 3 and subsequent figures correspond to the X, Y, and Z directions shown in FIGS. 1 and 2. In the following description, when a direction is identified, "+" indicates a positive direction that is a direction indicated by an arrow, "−" indicates a negative direction that is a direction opposite to the direction indicated by an arrow, and positive and negative symbols are used together to indicate directions.

As shown in FIGS. 1 and 2, the injection molding device 10 includes an injection unit 100, a mold clamping device 130, a mold 160, and a control unit 500. The injection molding device 10 injects a molding material from the injection unit 100 into the mold 160 to form a molded product. Operations of the injection unit 100 and the mold clamping device 130 are controlled by the control unit 500. The control unit 500 is implemented as a computer including a CPU and a memory, and controls each unit of the injection molding device 10 by the CPU executing a program stored in the memory. The control unit 500 may be constituted by a circuit.

In the embodiment, the metal mold 160 is mounted on the mold clamping device 130. The mold 160 is not limited to being made of a metal, and may be made of a resin or a ceramic. The metal mold 160 is referred to as a mold. The mold 160 includes a fixed mold 161 and a movable mold 162. The fixed mold 161 is a mold fixed to the injection unit 100, and the movable mold 162 is a mold that can be moved forward and backward in a mold clamping direction with respect to the fixed mold 161 by the mold clamping device 130. In the embodiment, the mold clamping direction is a −Y direction.

The mold clamping device 130 has a function of opening and closing the fixed mold 161 and the movable mold 162. Under control of the control unit 500, the mold clamping device 130 causes a ball screw 132 to rotate by driving a mold drive unit 131 including a motor, and causes the movable mold 162 joined to the ball screw 132 to move with respect to the fixed mold 161, thereby opening and closing the mold 160.

A hopper 30 into which a material of the molded product is fed is coupled to the injection unit 100. As the material of the molded product, for example, a thermoplastic resin formed in a pellet shape is used. Examples of the thermoplastic resin include acrylonitrile butadiene styrene (ABS), polycarbonate (PC), polyacetal (POM), polypropylene (PP), and polybutylene terephthalate (PBT). A supply of the material to the injection unit 100 is not limited to the hopper 30, and may be performed via, for example, a tube to which the material is pressure-fed.

The injection unit 100 plasticizes at least a part of the material supplied from the hopper 30 to generate a molding material, and injects the molding material into a cavity partitioned between the fixed mold 161 and the movable mold 162. In the present specification, the molding material is also referred to as a plasticized material. In the present specification, "plasticize" is a concept including melting, and refers to changing from a solid state to a state of presenting fluidity. Specifically, in a case of a material in which glass transition occurs, the "plasticize" refers to setting a temperature of the material to be equal to or higher than a glass transition point. In a case of a material in which the glass transition does not occur, the "plasticize" refers to setting a temperature of the material to be equal to or higher than a melting point.

Figure 3:
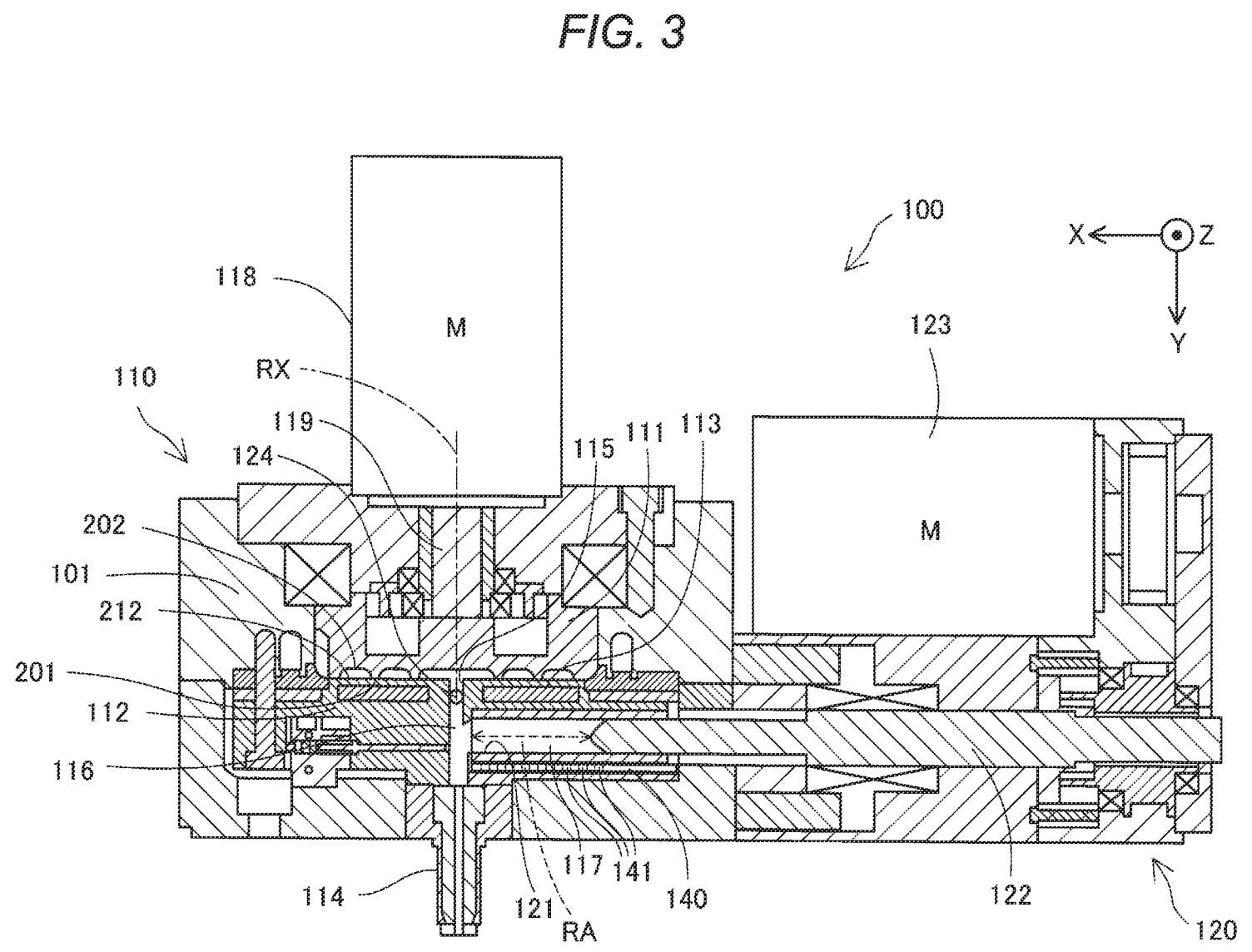

FIG. 3 is a cross-sectional view showing a schematic configuration of the injection unit 100. The injection unit 100 according to the embodiment includes a plasticizing device 110. The plasticizing device 110 includes a flat screw 111, a barrel 112, a heater 113 as a heating unit, an aspiration delivery unit 120, and a nozzle 114.

The flat screw 111 is accommodated in an accommodation portion 101. The flat screw 111 is also referred to as a rotor or simply a screw. The flat screw 111 is rotated by a drive motor 118 in the accommodation portion 101 around a drive shaft 119 of the drive motor 118. A center axis RX, which is a rotation center of the flat screw 111, coincides with a center of the drive shaft 119 of the drive motor 118 in an XZ plane. In the embodiment, axial directions of the drive shaft 119 and the center axis RX are aligned with the Y direction. The rotation of the flat screw 111 by the drive motor 118 is controlled by the control unit 500. The flat screw 111 may be driven by the drive motor 118 via a speed reducer.

A communication hole 115 is formed at a center of the barrel 112. The communication hole 115 communicates with a flow path 116. A cylinder 121 and the nozzle 114, which will be described later, are coupled to the flow path 116. The flow path 116 is provided with a check valve 124 upstream of the cylinder 121. The check valve 124 prevents backflow of the plasticized material from a nozzle 114 side to a flat screw 111 side.

The heater 113 heats the barrel 112 and the cylinder 121. Heating performed by the heater 113 is controlled by the control unit 500. In FIG. 3, the heater 113 is disposed on a −Y direction side of the cylinder 121, but the heater 113 may be disposed on a +Z direction side or a −Z direction side of the cylinder. In addition, a plurality of heaters 113 may be disposed so as to sandwich the cylinder 121 from the +Z direction side and the −Z direction side.

Figure 4:
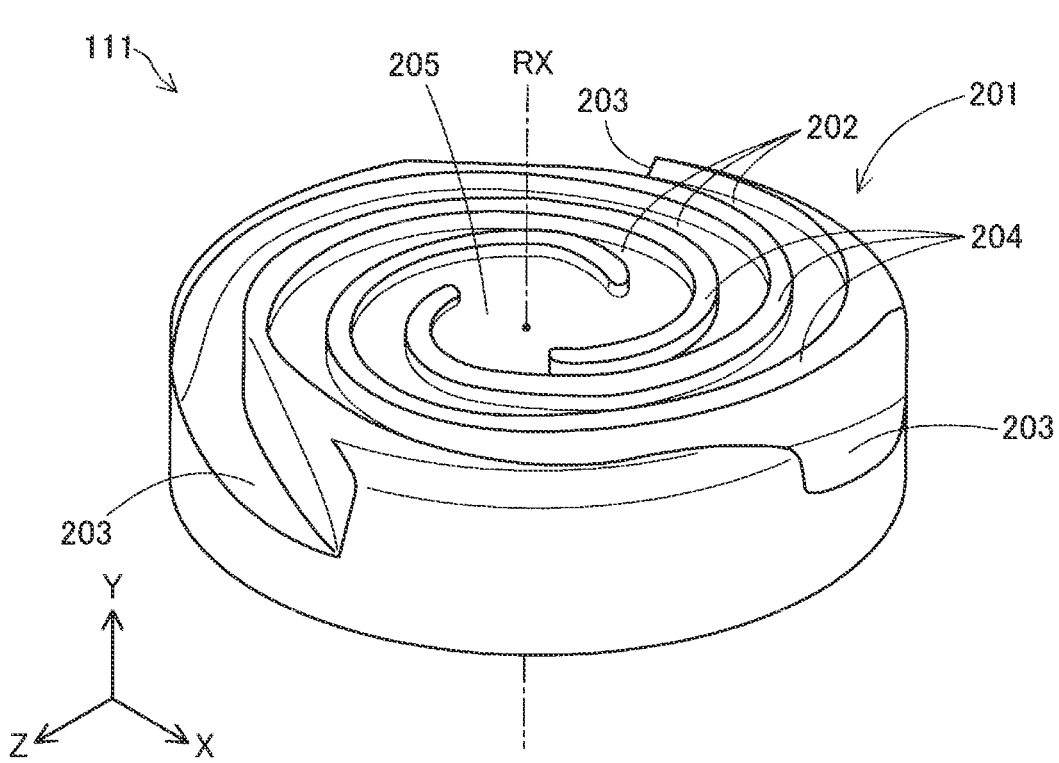
FIG. 4 is a perspective view showing a schematic configuration of a flat screw.

FIG. 4 is a perspective view showing a schematic configuration of the flat screw 111. The flat screw 111 has a substantially cylindrical shape whose height in a direction along the center axis RX is smaller than a diameter. On a groove forming surface 201 of the flat screw 111 facing the barrel 112, spiral grooves 202 are formed around a center portion 205. The groove 202 communicates with a material inlet 203 formed in a side surface of the flat screw 111. The material supplied from the hopper 30 is supplied to the groove 202 through the material inlet 203. The grooves 202 are formed by being separated by ridge portions 204. FIG. 4 shows an example in which three grooves 202 are formed, but the number of grooves 202 may be one, or may be two or more. A shape of the grooves 202 is not limited to a spiral shape, and may be a helical shape or an involute curve shape, or may be a shape extending in a manner of drawing an arc from the center portion 205 toward an outer periphery.

Figure 5:
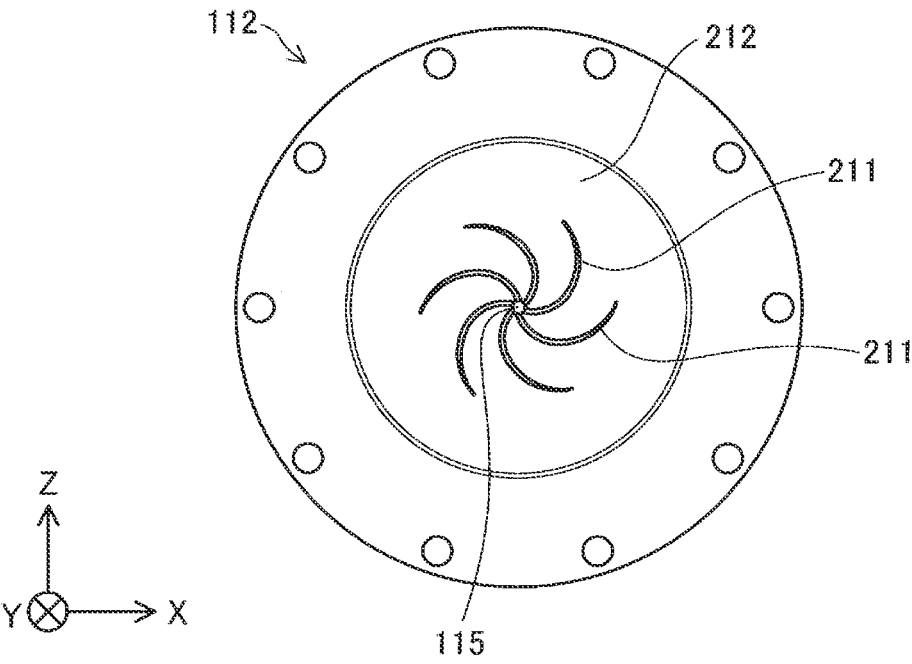
FIG. 5 is a schematic plan view of a barrel.

FIG. 5 is a schematic plan view of the barrel 112. The barrel 112 has a facing surface 212 facing the groove forming surface 201 of the flat screw 111 in the direction along the drive shaft 119. The communication hole 115 communicating with the flow path 116 is formed at a center of the facing surface 212. A plurality of guide grooves 211 coupled to the communication hole 115 and extending in a spiral shape from the communication hole 115 toward the outer periphery are formed in the facing surface 212. The guide grooves 211 may not be provided in the barrel 112. The guide grooves 211 may not be coupled to the communication hole 115.

While the material supplied to the groove 202 of the flat screw 111 is plasticized between the flat screw 111 and the barrel 112 by the rotation of the flat screw 111 and the heating of the heater 113, the material flows along the grooves 202 and the guide grooves 211 by the rotation of the flat screw 111, and is guided to the center portion 205 of the flat screw 111. The material flowing into the center portion 205 flows to the flow path 116 from the communication hole 115 provided at the center of the barrel 112. In the present specification, a space between the groove forming surface 201 of the flat screw 111 and the facing surface of the barrel 112 is also a part of the flow path 116. That is, the material or the plasticized material passes through the flow path 116.

As shown in FIG. 3, the aspiration delivery unit 120 includes the cylinder 121, a plunger 122, and a plunger drive unit 123. The cylinder 121 has a branch flow path 117 branched from the flow path 116 as a part of the flow path 116. That is, the cylinder 121 has the branch flow path 117 therein. The aspiration delivery unit 120 has a function of injecting the plasticized material in the cylinder 121 into a cavity of the mold 160. Under the control of the control unit 500, the aspiration delivery unit 120 controls an injection amount, an injection speed, and an injection pressure of the molding material from the nozzle 114. The cylinder 121 has a substantially cylindrical shape, and includes the plunger 122 therein. The plunger 122 moves inside the cylinder 121 in a direction away from the flow path 116, and aspirates the plasticized material into the branch flow path 117 to measure the plasticized material. In addition, the plunger 122 moves inside the cylinder 121 in a direction approaching the flow path 116, and delivers the aspirated plasticized material to the flow path 116. The delivered plasticized material is pressure-fed to the nozzle 114. The plunger 122 is driven by the plunger drive unit 123 including a motor. The plasticized material pressure-fed to the nozzle 114 is injected from the nozzle 114 into the cavity of the mold 160.

The plasticizing device 110 includes a plurality of measurement units 141. The plurality of measurement units 141 are disposed outside the cylinder 121 along a length direction of the cylinder 121. These measurement units 141 measure pressures or temperatures at a plurality of locations in the flow path 116. In the embodiment, the measurement units 141 measure temperatures at a plurality of locations in the branch flow path 117 of the flow path 116.

In the embodiment, the plurality of measurement units 141 include a sensor implemented by one optical fiber 140. Specifically, the plurality of measurement units 141 are implemented by a fiber bragg grating (FBG) sensor formed in a core of the optical fiber 140. The FBG is a portion in which a periodic refractive index change is formed in the core of the optical fiber 140. The refractive index change functions as a diffraction grating, and reflects only light having a wavelength satisfying a bragg reflection condition created by a period of the diffraction grating. By observing a bragg wavelength of the reflected light, a temperature around the FBG and a pressure applied to the FBG can be measured. A light source that emits light to the optical fiber 140 and a measuring instrument that receives reflected light to measure a temperature and a pressure are coupled to the optical fiber 140. The control unit 500 acquires the temperature or pressure measured by the plurality of measurement units 141 from the measuring instrument coupled to the optical fiber 140.

Figure 6:
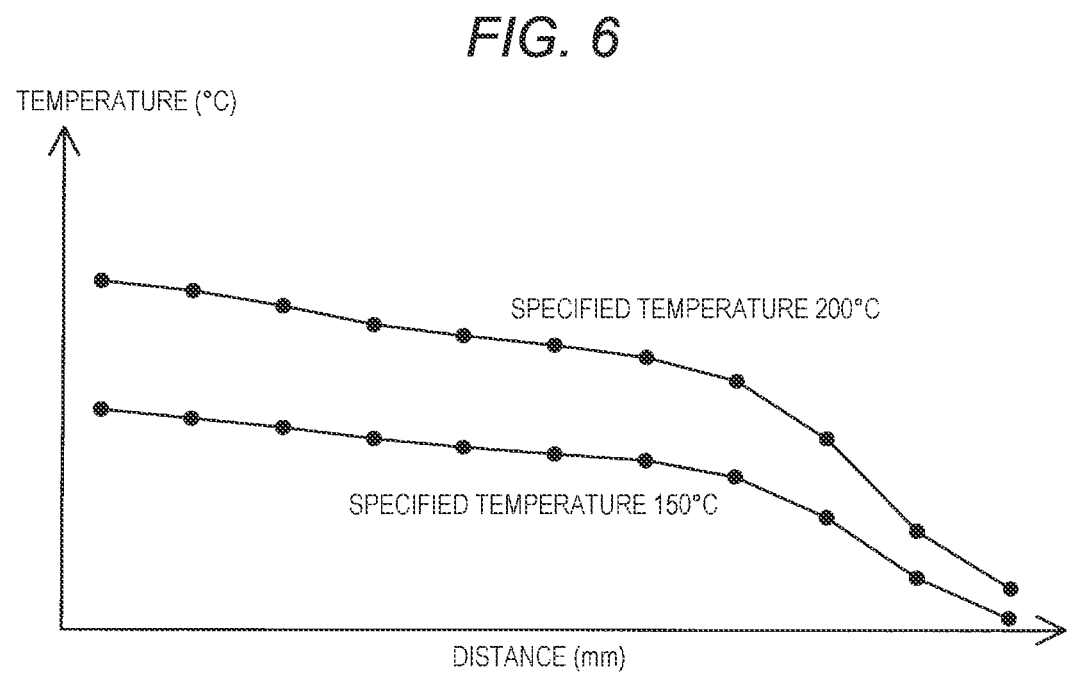

FIG. 6 is a diagram showing an example of measurement results of temperatures of the plasticized material in the branch flow path 117 that are obtained by the plurality of measurement units 141. A horizontal axis of the graph shown in FIG. 6 represents a distance from a tip end of the cylinder 121 to each measurement unit 141, and a vertical axis represents a temperature measured by each measurement unit 141. FIG. 6 shows a temperature distribution when a specified temperature of the heater 113 is set to 150° C. and a temperature distribution when the specified temperature of the heater 113 is set to 200° C. As shown in FIG. 6, as the distance from the tip end of the cylinder 121 increases, the temperature of the plasticized material decreases due to influences of heat radiation to the air and a cooling mechanism. In this manner, by using the plurality of measurement units 141, the control unit 500 can identify a state of the plasticized material in the branch flow path 117 in detail based on a plurality of measurement values measured by the plurality of measurement units 141. Although FIG. 6 shows the temperature distribution of the plasticized material in the branch flow path 117, the control unit 500 can measure a pressure distribution of the plasticized material in the branch flow path 117 by using the FBGs as the plurality of measurement units 141.

Figure 7:
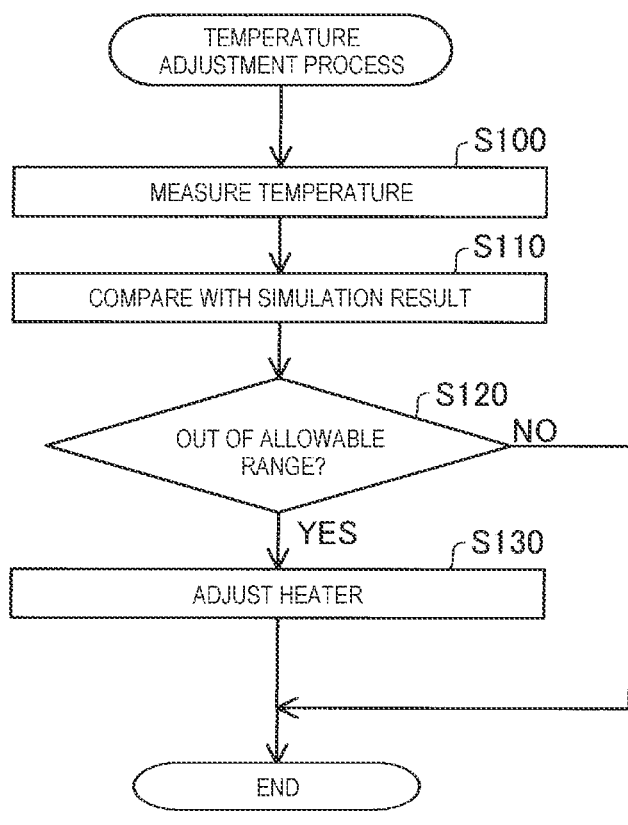
FIG. 7 is a flowchart of a temperature adjustment process executed in a first embodiment.

FIG. 7 is a flowchart of a temperature adjustment process executed by the control unit 500. This temperature adjustment process is a process executed by the control unit 500 every time the plasticized material is aspirated into the branch flow path 117 during an injection molding cycle.

In step S100, the control unit 500 uses the plurality of measurement units 141 to measure the temperature in the branch flow path 117 and identify the temperature distribution.

In step S110, the control unit 500 compares the temperature distribution identified in step S100 with a temperature distribution calculated by simulation performed in advance.

In step S120, the control unit 500 determines whether the temperature distribution identified in step S100 is out of an allowable range with respect to the temperature distribution calculated by the simulation. Specifically, when the temperature distribution identified in step S100 falls within a predetermined temperature range from the temperature distribution obtained by the simulation, the control unit 500 determines that the temperature distribution falls within the allowable range, and when the temperature distribution does not fall within the predetermined temperature range, the control unit 500 determines that the temperature distribution is out of the allowable range.

When it is determined in step S120 that the temperature distribution identified in step S100 is out of the allowable range with respect to the temperature distribution calculated by the simulation, the control unit 500 adjusts the temperature of the heater 113 in step S130. Specifically, if a temperature range of the temperature distribution identified in step S100 is lower than that of the temperature distribution calculated by the simulation, the temperature of the heater 113 is increased, and if the temperature range of the temperature distribution identified in step S100 is higher than that of the temperature distribution calculated by the simulation, the temperature of the heater 113 is decreased. On the other hand, in step S120, when it is determined that the temperature distribution identified in step S100 is within the allowable range with respect to the temperature distribution calculated by the simulation, the control unit 500 skips the process of step S130.

The control unit 500 can bring the temperature distribution of the plasticized material in the branch flow path 117 close to the temperature distribution calculated by the simulation by executing the temperature adjustment process described above every time the plasticized material is aspirated into the branch flow path 117.

According to the injection molding device 10 of the first embodiment described above, a temperature state of the plasticized material in the branch flow path 117 can be identified in detail by measuring the temperature in the branch flow path 117 using the plurality of measurement units 141. In addition, in the embodiment, since the heating performed by the heater 113 is controlled based on the comparison result between the temperature distribution in the flow path 116 measured by the plurality of measurement units 141 and the predetermined temperature distribution, it is possible to adjust the temperature of the plasticized material with high accuracy. Further, in the embodiment, since the plurality of measurement units 141 are implemented by the optical fiber 140, it is possible to prevent an increase in size of the plasticizing device 110 by providing the plurality of measurement units 141.

In the first embodiment, as shown in FIG. 7, the control unit 500 measures the temperature of the branch flow path 117 using the plurality of measurement units 141. Alternatively, the control unit 500 may measure the pressure in the branch flow path 117 using the plurality of measurement units 141. In this case, the control unit 500 obtains a pressure distribution in the branch flow path based on measurement results of the pressures obtained by the plurality of measurement units 141. Then, the pressure distribution is compared with a pressure distribution calculated by simulation, and the pressure of the plasticized material is adjusted by controlling a rotation speed of the flat screw 111 in accordance with a result of the comparison. In this adjustment, the control unit 500 increases the rotation speed of the flat screw 111 when the measured pressure distribution is a distribution in which a pressure is lower than an allowable range according to a simulation result, and decreases the rotation speed of the flat screw 111 when the measured pressure distribution is a distribution in which a pressure is higher than the allowable range. Accordingly, it is possible to adjust the pressure of the plasticized material in the branch flow path 117 with high accuracy.

B. Second Embodiment

Figure 8:
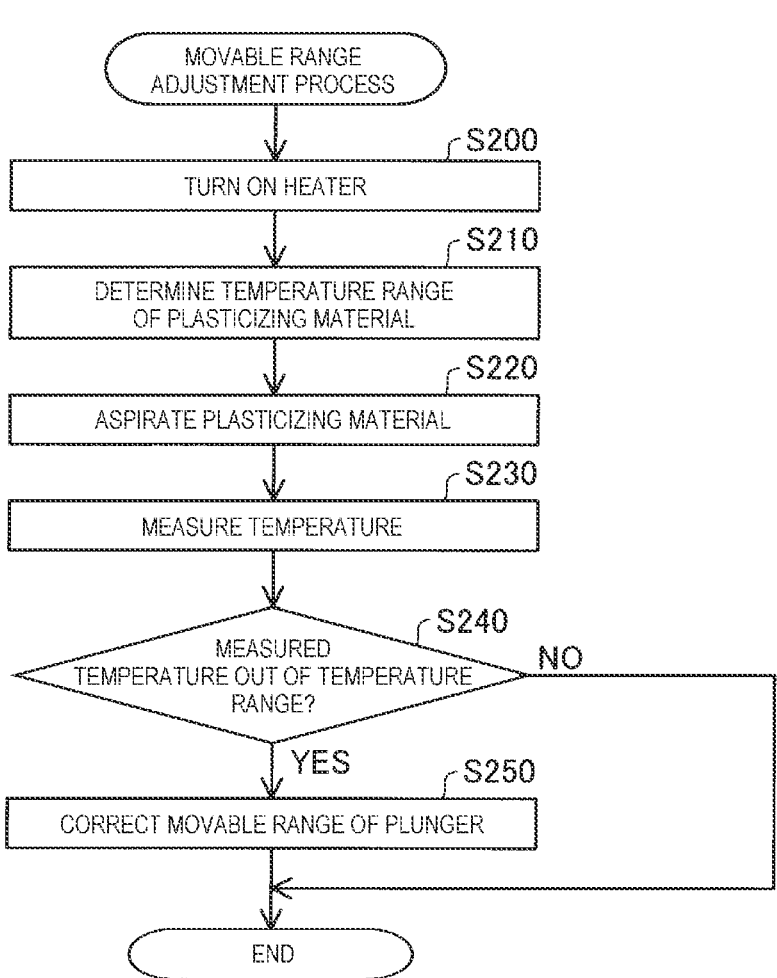
FIG. 8 is a flowchart of a movable range adjustment process executed in a second embodiment.

FIG. 8 is a flowchart of a movable range adjustment process executed in a second embodiment. In the second embodiment, the control unit 500 adjusts a movable range RA of the plunger 122 shown in FIG. 3 by executing the movable range adjustment process shown in FIG. 8 before a start of the injection molding cycle. The movable range RA of the plunger 122 is a range in which the tip end of the plunger 122 moves in the cylinder 121 as indicated by a dashed arrow in FIG. 3. The configuration of the injection molding device 10 in the second embodiment is the same as that in the first embodiment. In the second embodiment, the temperature adjustment process according to the first embodiment shown in FIG. 7 may not be executed.

In step S200 of FIG. 8, the control unit 500 turns on the heater 113, and adjusts an output of the heater 113 based on a temperature specified under molding conditions, so that the barrel 112 and the cylinder 121 are heated.

In step S210, the control unit 500 determines a temperature range of the plasticized material in accordance with the molding conditions.

In step S220, the control unit 500 controls the drive motor 118 to rotate the flat screw 111 and plasticize the material, and controls the plunger drive unit 123 to aspirate the plasticized material into the branch flow path 117.

In step S230, the control unit 500 measures the temperature of the plasticized material in the branch flow path 117 using the plurality of measurement units 141.

In step S240, the control unit 500 determines whether each temperature measured by the measurement units 141 located in a maximum range of the movable range RA of the plunger 122 is out of the temperature range determined in step S210.

When it is determined in step S240 that the temperatures measured in the maximum movable range RA of the plunger 122 do not fall within the temperature range set in step S210, the control unit 500 corrects the movable range RA of the plunger 122 in step S250. Specifically, the control unit 500 reduces the range of the movable range RA of the plunger 122 toward a tip end side of the cylinder 121, so that all the temperatures measured in the movable range RA of the plunger 122 fall within the temperature range set in step S210. On the other hand, when it is determined in step S240 that the temperatures measured in the maximum movable range RA of the plunger 122 fall within the temperature range determined in step S210, the control unit 500 skips the process of step S250.

After the movable range adjustment process described above is executed, the control unit 500 starts the injection molding cycle to form the molded product.

According to the second embodiment described above, since the movable range RA of the plunger 122 is corrected according to the temperature distribution of the plasticized material in the branch flow path 117, the movable range RA of the plunger 122 can be adjusted to the optimum movable range RA. As a result, the plasticized material having a temperature lower than the set temperature range can be prevented from being injected to the mold 160, so that molding quality of the molded product can be improved.

When the movable range RA of the plunger 122 becomes less than a predetermined reference range as a result of the correction of the movable range RA of the plunger 122 in step S250 shown in FIG. 8, that is, when an injection amount obtained by the correction of the movable range of the plunger 122 becomes less than a reference amount, the control unit 500 may adjust the movable range of the plunger 122 to be equal to or more than the reference range and increase the output of the heater 113. Accordingly, it is possible to prevent the injection amount obtained by the correction of the movable range RA of the plunger 122 from becoming less than a reference amount.

In the second embodiment, the control unit 500 corrects the movable range RA of the plunger 122 based on the temperature distribution measured by the plurality of measurement units 141. Alternatively, the control unit 500 may measure pressures using the plurality of measurement units 141, and correct the movable range RA of the plunger 122 based on a distribution of the pressures. Specifically, the control unit 500 enlarges or reduces the movable range RA, so that the pressures measured in the movable range RA fall within a pressure range determined under the molding conditions.

C. Third Embodiment

Figure 9:
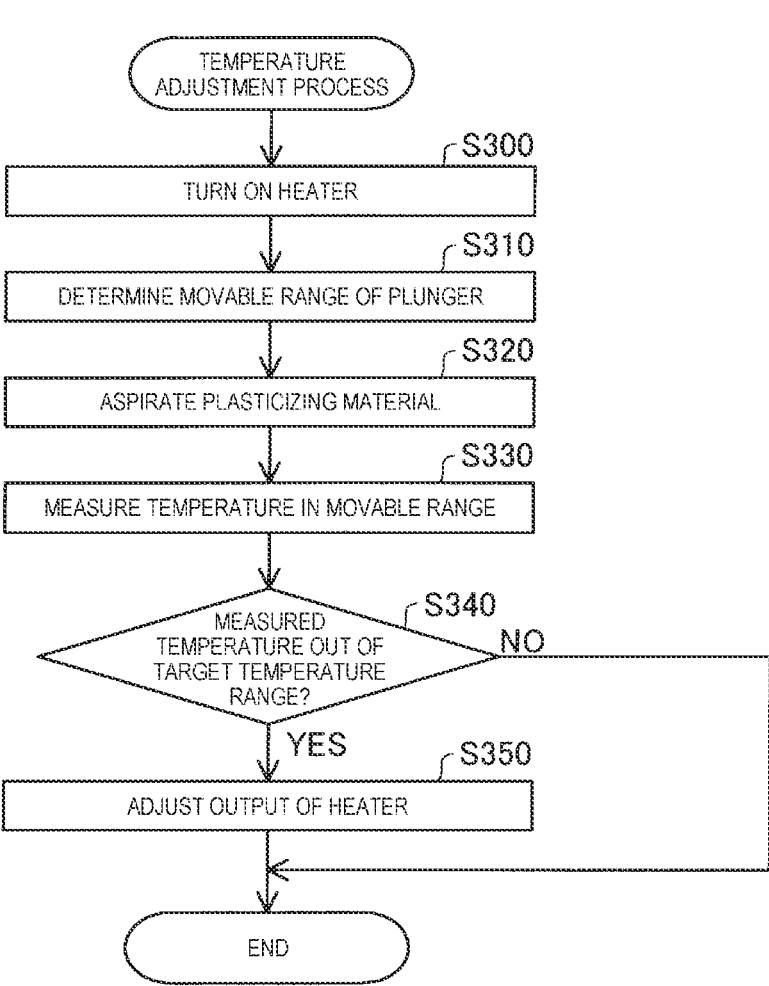
FIG. 9 is a flowchart of a temperature adjustment process executed in a third embodiment.

FIG. 9 is a flowchart of a temperature adjustment process executed in a third embodiment. In the third embodiment, the control unit 500 adjusts a temperature of the heater 113 by executing the temperature adjustment process shown in FIG. 9 before the start of the injection molding cycle. The configuration of the injection molding device 10 in the third embodiment is the same as that in the first embodiment. In the third embodiment, the temperature adjustment process according to the first embodiment shown in FIG. 7 may not be executed.

In step S300 of FIG. 9, the control unit 500 turns on the heater 113, and adjusts the output of the heater 113 based on the temperature specified under molding conditions, so that the barrel 112 and the cylinder 121 are heated.

In step S310, the control unit 500 determines the movable range RA of the plunger 122 in accordance with the molding conditions.

In step S320, the control unit 500 controls the drive motor 118 to rotate the flat screw 111 and plasticize the material, and controls the plunger drive unit 123 to aspirate the plasticized material into the branch flow path 117 in accordance with the movable range RA determined in step S310.

In step S330, the control unit 500 measures the temperature of the plasticized material in the movable range RA of the plunger 122 using the plurality of measurement units 141.

In step S340, the control unit 500 determines whether each temperature measured in the movable range RA is out of a target temperature range determined under the molding conditions.

When it is determined in step S340 that the temperatures measured in the movable range RA are out of the target temperature range determined under the molding conditions, the control unit 500 adjusts the output of the heater 113 in step S350. Specifically, the control unit 500 increases or decreases the output of the heater 113, so that the temperatures measured in the movable range RA fall within the target temperature range. On the other hand, when it is determined in step S340 that the temperatures measured in the movable range RA fall within the target temperature range, the control unit 500 skips the process of step S350.

After the temperature adjustment process described above is executed, the control unit 500 starts the injection molding cycle to form the molded product.

According to the third embodiment described above, since the output of the heater 113 is adjusted in accordance with the temperature measured in the movable range RA of the plunger 122, the output of the heater 113 can be adjusted to an optimum output. As a result, it is possible to prevent a change in temperature of the plasticized material according to a length of the movable range RA of the plunger 122, and thus it is possible to improve the molding quality of the molded product.

In the third embodiment, the control unit 500 adjusts the output of the heater 113 based on the temperature distribution measured by the plurality of measurement units 141. Alternatively, the control unit 500 may measure pressures using the plurality of measurement units 141, and adjust the output of the heater 113 based on a distribution of the pressures. Specifically, the control unit 500 increases or decreases the output of the heater 113, so that the pressures measured in the movable range RA fall within a target pressure range determined under the molding conditions.

The second embodiment and the third embodiment described above can be combined. Specifically, after the movable range RA of the plunger 122 is corrected in step S250 of the movable range adjustment process in the second embodiment shown in FIG. 8, the processes of steps S320 to S350 of the temperature adjustment process in the third embodiment shown in FIG. 9 may be executed. Accordingly, after the movable range RA of the plunger 122 is corrected in the second embodiment, the temperature in the corrected movable range RA can be adjusted.

D. Fourth Embodiment

Figure 10:
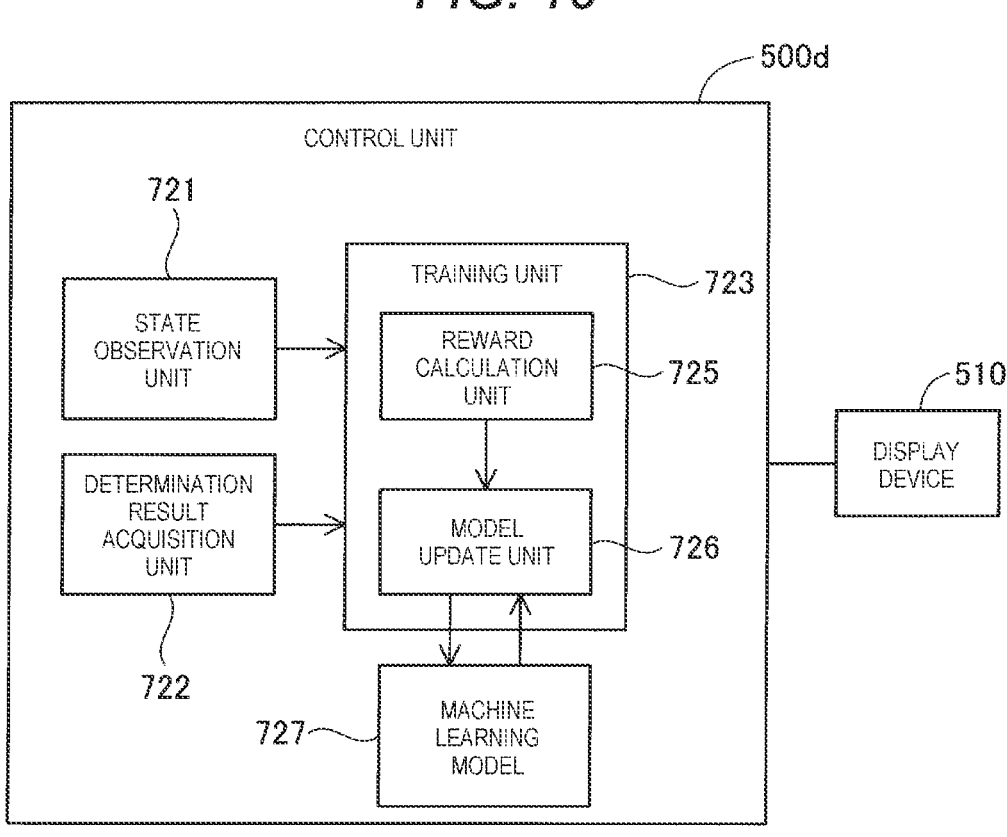
FIG. 10 is a functional block diagram of a control unit according to a fourth embodiment.

FIG. 10 is a functional block diagram of a control unit 500*d* according to a fourth embodiment. In the fourth embodiment, the control unit 500*d* performs machine learning on the temperature distribution of the plasticized material in the branch flow path 117 using a data set including a material type and control conditions including at least a part of a control condition of the heater 113 and a control condition of the flat screw 111, and measurement values obtained by the plurality of measurement units 141. The control condition of the heater 113 is, for example, the output of the heater 113, and the control condition of the flat screw 111 is, for example, the rotation speed of the flat screw 111. The configuration of the injection molding device 10 in the fourth embodiment is the same as that in the first embodiment.

The control unit 500*d* includes, as functional blocks, a state observation unit 721, a determination result acquisition unit 722, and a training unit 723. The training unit 723 includes a reward calculation unit 725 and a model update unit 726. These functional blocks are implemented in software by a CPU provided in the control unit 500*d* executing a program stored in a memory.

The control unit 500*d* uses a machine learning model 727 to predict the temperature distribution of the plasticized material in the branch flow path 117 based on the data set acquired by the state observation unit 721. The control unit 500*d* displays a prediction result thereof on a display device 510 coupled to the control unit 500*d*.

The state observation unit 721 acquires the data set described above and observes these values.

The determination result acquisition unit 722 acquires determination data indicating whether the predicted temperature distribution of the plasticized material approximates a temperature distribution actually measured by the measurement units 141.

The training unit 723 uses the data set observed by the state observation unit 721 and the determination data acquired by the determination result acquisition unit 722, and performs training on a correlation among the material type, the control conditions including at least a part of the control condition of the heater 113 and the control condition of the flat screw 111, and the measurement values of the temperature obtained by the plurality of measurement units 141. The training unit 723 updates the machine learning model 727 based on a trained result. The machine learning model 727 is represented by, for example, a value function to be described later.

A learning algorithm executed by the training unit 723 is not particularly limited, and learning algorithms known as the machine learning such as supervised learning, unsupervised learning, reinforcement learning, and neural networks can be adopted. The training unit 723 shown in FIG. 10 executes the reinforcement learning as an example of the learning algorithm. The reinforcement learning is a method of repeating a cycle of executing a predetermined action in a current state while observing the current state of an environment in which a learning target exists and giving some kind of reward to the action by trial and error, and training, as an optimal solution, a measure that maximizes a total reward.

An example of the algorithm of the reinforcement learning executed by the training unit 723 will be described. The algorithm according to this example is known as Q-learning, and is a method of using a state s of an action subject and an action a in which the action subject can be selected in the state s as independent variables, and training a function Q (s, a) representing a value of the action when the action a is selected in the state s. The optimal solution is to select the action a in which the value function Q becomes the highest in the state s. By starting the Q-learning in a state where a correlation between the state s and the action a is unknown and repeating the trial and error that selects various actions a in any state s, the value function Q is repeatedly updated to approach to the optimal solution. Here, when the environment, that is, the state s changes as a result of selecting the action a in the state s, a reward r, that is, a weighting of the action a can be acquired according to the change, training is guided such that the action a is selected in which a higher reward r is acquired, so that the value function Q can be approached to the optimal solution in a relatively short time.

An update formula of the value function Q can be generally represented as the following Formula (1).

$$Q(s_{t+1}, a_{t+1}) \leftarrow Q(s_t, a_t) + \propto (r_{t+1} + \gamma \max Q(s_{t+1}, a) - Q(s_t, a_t)) \tag{1}$$

In the Formula (1), $s_t$ and $a_t$ are a state and an action at time t, respectively, and the state changes to $s_{t+1}$ depending on the action $a_t$. $r_{t+1}$ is the reward acquired by changing the state from $s_t$ to $s_{t+1}$. A term of maxQ means the Q when the action a that gives a maximum value Q at time t+1 is performed at the time t. $\propto$ and $\gamma$ are a training coefficient and a discount rate, respectively, and are optionally set with $0<\propto\leq1$ and $0<\gamma\leq1$.

When the training unit 723 executes the Q-learning, a state variable S observed by the state observation unit 721 and determination data Dj acquired by the determination result acquisition unit 722 correspond to the state s of the update formula, the action corresponding to the temperature distribution of the plasticized material according to the data set corresponds to the action a of the update formula, and the reward R obtained by the reward calculation unit 725 corresponds to the reward r of the update formula. Therefore, the model update unit 726 repeatedly updates, by the Q-learning using the reward R, the function Q representing the state of the temperature distribution of the plasticized material. The reward R obtained by the reward calculation unit 725 increases or decreases in accordance with an approximation ratio of the actual temperature distribution to a temperature distribution determined using the value function Q, for example.

According to the fourth embodiment described above, the temperature distribution in the branch flow path 117 can be predicted from the material type, the control condition of the heater 113, and the control condition of the flat screw 111 based on the machine learning result.

The fourth embodiment describes that the training unit 723 performs the machine learning on the temperature distribution in the branch flow path 117. Alternatively, when the pressure in the branch flow path 117 is measured by using the plurality of measurement units 141, the training unit 723 can perform the machine learning on the pressure distribution in the branch flow path 117.

A content subject to the machine learning of the training unit 723 is not limited to the temperature distribution and the pressure distribution in the branch flow path 117, and for example, a plasticizing condition of the material may be learned. The plasticizing condition of the material is a control condition of each unit used for plasticizing the material, such as the rotation speed of the flat screw 111 and the output of the heater 113. The control unit 500*d* acquires, by the state observation unit 721, the data set including the material type, the control conditions, that is, the plasticizing condition, including at least a part of the control condition of the heater 113 and the control condition of the flat screw 111, and the measurement values obtained by the plurality of measurement units 141, and trains a relationship between the material and the plasticizing condition, so that the temperature distribution or the pressure distribution of the plasticized material in the branch flow path 117 becomes a suitable distribution. As described above, when the machine learning of the plasticizing condition of the material is performed using the data set including the material type, the control conditions including at least a part of the control condition of the heater 113 and the control condition of the flat screw 111, and the plurality of measurement values, it is possible to predict the optimum plasticizing condition corresponding to a new material at the time of, for example, switching the material.

In addition, the measurement results of the temperature and the pressure by the plurality of measurement units 141 can be used for, for example, analysis of a plasticizing mechanism in the plasticizing device 110, and analysis of an optimum arrangement of sensors for performing feedback control on the temperature or the pressure of the plasticized material with high accuracy.

E. Fifth Embodiment

Figure 11:
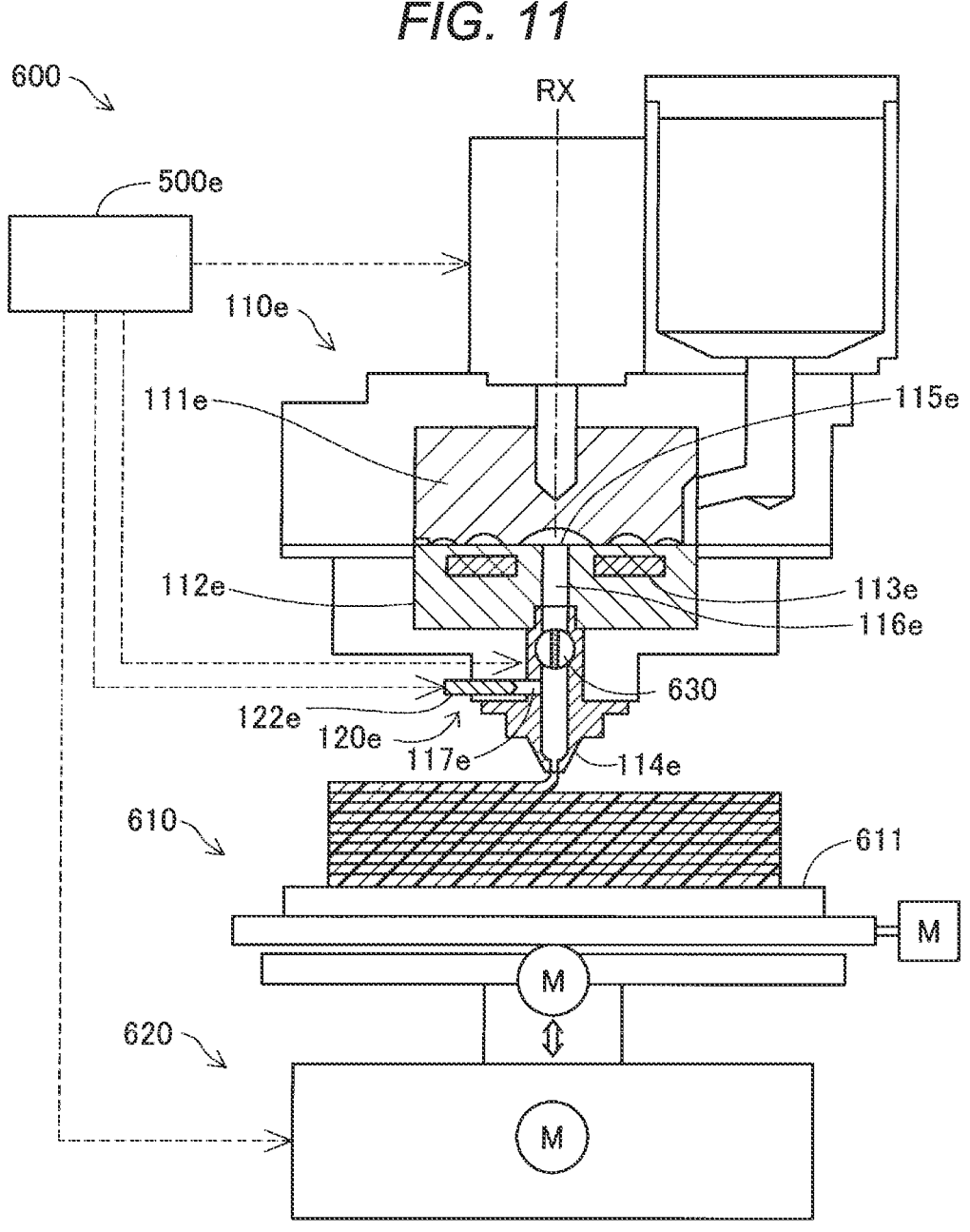
FIG. 11 is a diagram showing a schematic configuration of a three-dimensional shaping device according to a fifth embodiment.

FIG. 11 is a diagram showing a schematic configuration of a three-dimensional shaping device 600 according to a fifth embodiment. The three-dimensional shaping device 600 includes a plasticizing device 110*e*, a shaping stage 610, a moving mechanism 620, and a control unit 500*e*.

The plasticizing device 110*e* includes a flat screw 111*e*, a barrel 112*e*, a heater 113*e*, an aspiration delivery unit 120*e*, and a nozzle 114*e*. In the embodiment, a valve 630, which switches a discharge amount of the plasticized material from the nozzle 114 or whether the plasticized material is discharged, is provided, instead of the check valve, in a flow path 116*e* that couples a communication hole 115*e* of the barrel 112*e* and the nozzle 114*e*. The valve 630 is driven under control of the control unit 500*e*. Other configurations of the plasticizing device 110*e* are the same as the configuration of the plasticizing device 110 according to the first embodiment.

The shaping stage 610 faces the nozzle 114*e*. The plasticized material discharged from the nozzle 114*e* is deposited on a shaping surface 611 on the stage 610. In the embodiment, the shaping surface 611 is along a horizontal direction. The shaping stage 610 is supported by the moving mechanism 620.

The moving mechanism 620 changes a relative position between the nozzle 114*e* and the shaping stage 610. In the embodiment, the moving mechanism 620 changes the relative position between the nozzle 114*e* and the shaping stage 610 by moving the shaping stage 610. The moving mechanism 620 in the embodiment is implemented by a three-axis positioner that moves the shaping stage 610 in three axial directions of the X, Y, and Z directions by power generated by three motors. Each motor is driven under the control of the control unit 500*e*. The moving mechanism 620 may change the relative position between the nozzle 114*e* and the shaping stage 610 by moving the plasticizing device 110*e* without moving the shaping stage 610. Further, the moving mechanism 620 may change the relative position between the nozzle 114*e* and the shaping stage 610 by moving both the shaping stage 610 and the plasticizing device 110*e*.

Under the control of the control unit 500*e*, the three-dimensional shaping device 600 discharges the plasticized material from the nozzle 114*e* while changing the relative position between the nozzle 114*e* and the shaping stage 610, thereby stacking a layer of the plasticized material on the shaping stage 610 to shape a three-dimensional shaped object having a desired shape. When temporarily stopping the discharge of the plasticized material from the nozzle 114*e* using the valve 630, the control unit 500*e* drives a plunger 122*e* provided in the aspiration delivery unit 120*e* to aspirate the plasticized material around the nozzle 114*e* into the branch flow path 117*e*. Then, at the time of resuming the discharge, the plunger 122*e* is driven to pressure-feed the plasticized material from the branch flow path 117*e* toward the nozzle 114*e*. Although not shown in FIG. 12, also in the embodiment, a plurality of measurement units that measure the temperature and pressure of the plasticized material in the branch flow path 117*e* are provided in the plasticizing device 110*e*.

Also in the fifth embodiment described above, similarly to the first embodiment, by measuring the temperature of the branch flow path 117*e* using the plurality of measurement units, the state of the temperature and the pressure of the plasticized material in the branch flow path 117*e* can be identified in detail. Also in the fifth embodiment, the temperature adjustment process in the first embodiment shown in FIG. 7, the movable range adjustment process in the second embodiment shown in FIG. 8, and the temperature adjustment process in the third embodiment shown in FIG. 9 may be performed. Also in the fifth embodiment, machine learning similar to the machine learning in the fourth embodiment may be performed.

Figure 12:
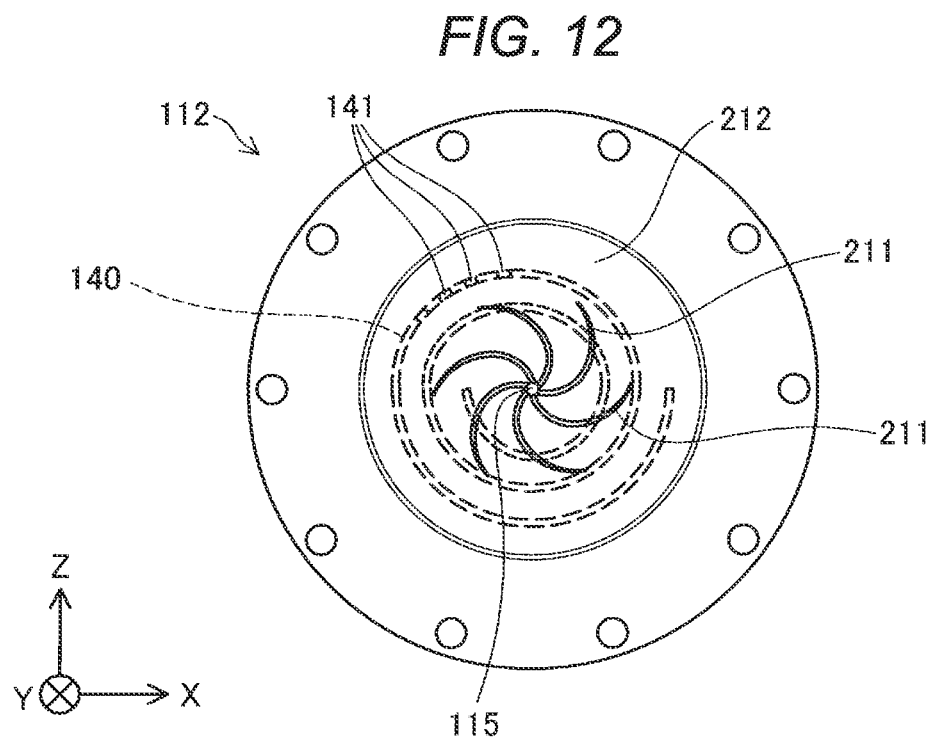
Figure 13:
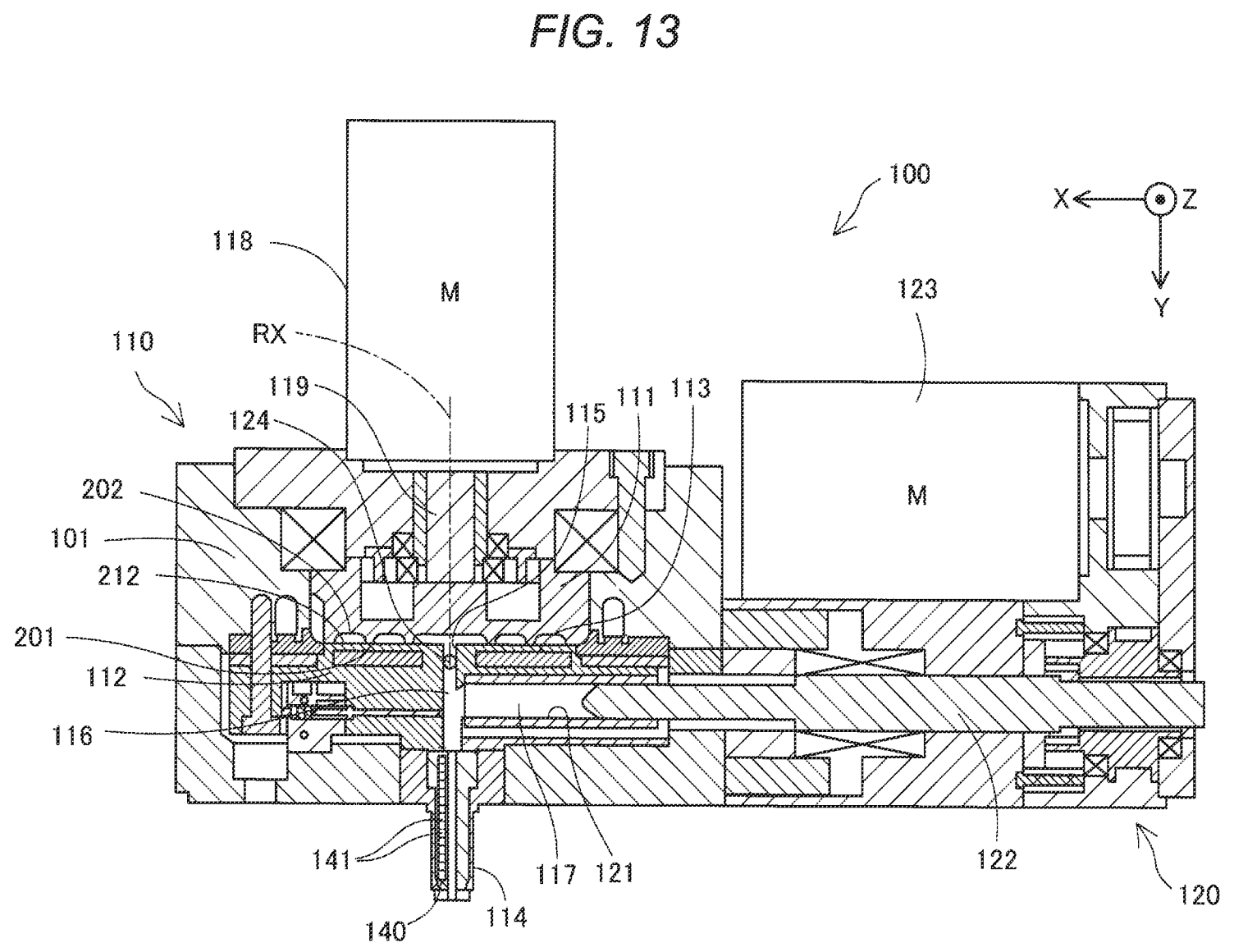

F. Other Embodiments (F1) In each of the above-described embodiments, the temperature and the pressure in the branch flow path 117 in which the plunger 122 is disposed are measured by the plurality of measurement units 141. Alternatively, the plurality of measurement units 141 are not limited to be disposed in the branch flow path 117, and may be disposed so as to be capable of measuring a state of the flow path in the nozzle 114 or a state of the flow path between the flat screw 111 and the barrel 112. FIG. 12 shows an example in which the plurality of measurement units 141 are disposed in a spiral shape in the barrel 112 in order to make it possible to measure the states of the material in the flow path between the flat screw 111 and the barrel 112 and the plasticized material. FIG. 13 shows an example in which a plurality of measurement units 141 are disposed along the flow path in the nozzle 114 in order to make it possible to measure the state of the plasticized material flowing through the flow path in the nozzle 114. As shown in FIGS. 12 and 13, when the plurality of measurement units 141 are disposed in the flow path in the nozzle 114 or the flow path between the flat screw 111 and the barrel 112, the arrangement of the plurality of measurement units 141 in the branch flow path 117 is not essential.

(F2) In each of the above-described embodiments, the plurality of measurement units 141 is implemented by the optical fiber 140. Alternatively, the plurality of measurement units 141 may be multi-point temperature sensors in which a plurality of thermocouples are sealed in one protective tube. In addition, each measurement unit 141 constituting the plurality of measurement units 141 may be implemented as an independent temperature sensor or pressure sensor.

G. Other Aspects

The present disclosure is not limited to the embodiments described above, and can be implemented in various forms without departing from the scope of the present disclosure. For example, technical features of the embodiments corresponding to technical features of the aspects described below can be appropriately replaced or combined in order to solve a part of or all of the above problems or to achieve a part of or all of the above effects. In addition, when the technical features are not described as essential in the present description, the technical features can be deleted as appropriate.

(1) According to a first aspect of the present disclosure, a plasticizing device is provided. The plasticizing device includes: a drive motor; a flat screw having a groove forming surface in which a groove is formed and configured to rotate around a drive shaft of the drive motor; a barrel having a facing surface facing the groove forming surface in a direction along the drive shaft and having a communication hole formed in the facing surface, the communication hole allowing a plasticized material as a plasticized material to flow out; a heating unit configured to heat the material supplied to the groove; a flow path through which the material or the plasticized material flows; a nozzle communicating with the flow path and allowing the plasticized material to flow to an outside; a plurality of measurement units configured to measure pressures or temperatures at a plurality of locations in the flow path; an aspiration delivery unit including a cylinder having a branch flow path as a part of the flow path and a plunger configured to move in the cylinder so as to aspirate the plasticized material into the branch flow path or deliver the aspirated plasticized material to the nozzle; and a control unit configured to identify a state of the material or the plasticized material in the flow path based on a plurality of measurement values measured by the plurality of measurement units, in which the plurality of measurement units measure temperatures or pressures at least at a plurality of locations in the branch flow path.

According to the plasticizing device in such an aspect, a state of the plasticized material in the branch flow path can be identified in detail by measuring the temperature or the pressure at plurality of locations in the branch flow path.

(2) In the above aspect, the control unit may control heating performed by the heating unit or rotation of the flat screw based on a comparison result between a temperature distribution or a pressure distribution of the material or the plasticized material in the flow path, which is measured by the plurality of measurement units and a temperature distribution or a pressure distribution of the material or the plasticized material determined in advance. According to such an aspect, the heating unit and the flat screw can be controlled based on the temperature distribution or the pressure distribution measured by the plurality of measurement units.

(3) In the above aspect, the plurality of measurement units may include a sensor implemented by an optical fiber. According to such an aspect, it is possible to prevent an increase in size of the plasticizing device.

(4) In the above aspect, the control unit may adjust a movable range of the plunger based on a temperature or a pressure of the plasticized material in the flow path, which is measured by the plurality of measurement units. According to such an aspect, the movable range of the plunger can be adjusted to an optimum movable range.

(5) In the above aspect, when the adjusted movable range is less than a reference range, the control unit may adjust the movable range to be equal to or more than the reference range and increase an output of the heating unit. According to such an aspect, it is possible to prevent the injection amount of the plasticized material obtained by the adjustment of the movable range of the plunger from becoming decreased.

(6) In the above aspect, the control unit may adjust an output of the heating unit based on a temperature distribution or a pressure distribution of the material or the plasticized material in the flow path, which is measured by the plurality of measurement units. According to such an aspect, the output of the heating unit can be adjusted to an optimum output.

(7) The above aspect may include a training unit configured to perform machine learning on a temperature distribution or a pressure distribution of the material or the plasticized material in the flow path using a data set including a material type, control conditions including at least a part of a control condition of the heating unit and a control condition of the flat screw, and the plurality of measurement values.

(8) The above aspect may include a training unit configured to perform machine learning on a plasticizing condition of the material using a data set including a material type, control conditions including at least a part of a control condition of the heating unit and a control condition of the flat screw, and the plurality of measurement values.

(9) According to a second aspect of the present disclosure, an injection molding device is provided. The injection molding device includes: the plasticizing device; and a mold clamping device in which a mold into which the plasticized material flowing out of the nozzle is injected is disposed.

(10) According to a third aspect of the present disclosure, a three-dimensional shaping device is provided. The three-dimensional shaping device includes: the plasticizing device and a stage having a shaping surface on which the plasticized material flowing out of the nozzle is deposited.

What is claimed is:

1. A plasticizing device comprising:

a drive motor;

a flat screw having a groove forming surface in which a groove is formed and configured to rotate around a center axis;

a barrel having a facing surface facing the groove forming surface in a direction along the center axis and having a communication hole formed in the facing surface, the communication hole allowing a plasticized material as a plasticized material to flow out;

a heating unit configured to heat the material supplied to the groove;

a flow path through which the material or the plasticized material flows;

a nozzle communicating with the flow path and allowing the plasticized material to flow to an outside;

a plurality of measurement units configured to measure pressures or temperatures at a plurality of locations in the flow path;

an aspiration delivery unit including a cylinder having a branch flow path as a part of the flow path and a plunger configured to move in the cylinder so as to aspirate the plasticized material into the branch flow path or deliver the aspirated plasticized material to the nozzle; and a control unit configured to identify a state of the material or the plasticized material in the flow path based on a plurality of measurement values measured by the plurality of measurement units, wherein the plurality of measurement units measure temperatures or pressures at least at a plurality of locations in the branch flow path.

2. The plasticizing device according to claim 1, wherein the control unit controls heating performed by the heating unit or rotation of the flat screw based on a comparison result between a temperature distribution or a pressure distribution of the material or the plasticized material in the flow path, which is measured by the plurality of measurement units and a temperature distribution or a pressure distribution of the material or the plasticized material determined in advance.

3. The plasticizing device according to claim 1, wherein the plurality of measurement units include a sensor implemented by an optical fiber.

4. The plasticizing device according to claim 1, wherein the control unit adjusts a movable range of the plunger based on a temperature or a pressure of the plasticized material in the flow path, which is measured by the plurality of measurement units.

5. The plasticizing device according to claim 4, wherein when the adjusted movable range is less than a reference range, the control unit adjusts the movable range to be equal to or more than the reference range and increases an output of the heating unit.

6. The plasticizing device according to claim 1, wherein the control unit adjusts an output of the heating unit based on a temperature distribution or a pressure distribution of the material or the plasticized material in the flow path, which is measured by the plurality of measurement units.

7. The plasticizing device according to claim 1, further comprising:

a training unit configured to perform machine learning on a temperature distribution or a pressure distribution of the material or the plasticized material in the flow path using a data set including a material type, control conditions including at least a part of a control condition of the heating unit and a control condition of the flat screw, and the plurality of measurement values.

8. The plasticizing device according to claim 1, further comprising:

a training unit configured to perform machine learning on a plasticizing condition of the material using a data set including a material type, control conditions including at least a part of a control condition of the heating unit and a control condition of the flat screw, and the plurality of measurement values.

9. An injection molding device, comprising:

the plasticizing device according to claim 1; and a mold clamping device in which a mold into which the plasticized material flowing out of the nozzle is injected is disposed.

* * * * *